United States Patent [19]

Macchiarulo et al.

[11] Patent Number: 5,015,218

[45] Date of Patent: May 14, 1991

[54] TOOTHED PULLEY AND TRANSMISSION RELATED THERETO

[75] Inventors: Vincenzo Macchiarulo, Pescara; Tommaso Di Giacomo, Guardiagrele, both of Italy

[73] Assignee: Pirelli Transmissioni Industriali S.p.A., Milan, Italy

[21] Appl. No.: 441,774

[22] Filed: Nov. 27, 1989

[30] Foreign Application Priority Data

Nov. 29, 1988 [IT] Italy ................... 22771 A/88

[51] Int. Cl.⁵ .................... F16G 1/28; F16H 55/36
[52] U.S. Cl. ..................... 474/152; 474/153; 474/205
[58] Field of Search ............... 474/152–155, 474/161, 164, 168–170, 202, 204, 205; 29/892.11, 892.3

[56] References Cited

U.S. PATENT DOCUMENTS

| | | | |
|---|---|---|---|
| 4,501,577 | 2/1985 | Roling et al. | 474/155 |
| 4,553,952 | 11/1985 | Tangorra et al. | 474/153 |
| 4,614,509 | 9/1986 | Tangorra et al. | 474/205 |
| 4,634,410 | 1/1987 | Tangorra et al. | 474/153 |
| 4,696,665 | 9/1987 | Macchiarulo et al. | 474/153 |

FOREIGN PATENT DOCUMENTS 61-112842 5/1986 Japan.
62-113939 5/1987 Japan.

*Primary Examiner*—Thuy M. Bui
*Attorney, Agent, or Firm*—Stevens, Davis, Miller & Mosher

[57] ABSTRACT

A toothed pulley is provided which includes a plurality of grooves alternating with a plurality of teeth. The flank of each groove is joined to the head of the adjacent tooth by a connection formed of at least two convex curvilinear segments and a recess. The curvilinear segments are tangent to the end of the flank and to the terminal point of the tooth head delimitated by the outer circumference of the pulley respectively. The pulley engages with a toothed belt which includes a connection between the tooth flank and the adjacent groove, which may be in the form of a parabolic arc.

18 Claims, 4 Drawing Sheets

TOOTHED PULLEY AND TRANSMISSION RELATED THERETO

FIELD OF THE INVENTION

The present invention relates to a toothed pulley and a transmission related thereto, and more particularly, to a toothed pulley with an improved connection between the teeth and the grooves adjacent to the teeth.

BACKGROUND OF THE INVENTION

A known type of toothed pulley comprises a plurality of grooves alternating with a plurality of teeth wherein each groove is joined to the teeth by a connection in the form of a circular arc. The toothed belt required to mesh with the pulleys in a synchronous transmission system comprises an elastomeric annular body delimited by two faces, from at least one of which projects a plurality of teeth alternating with a plurality of grooves. Each tooth is also joined to the adjacent grooves by means of a connection in the form of a circular arc.

It is usual in the above type of transmissions for the connections of the pulley and the belt engaging with the pulleys to have circular arcs whose radii are substantially identical or in any event of comparable values.

During the transmission of motion, a state of stress is generated by the relative mechanical thrusts between the belt teeth, which are made of elastically deformable material, and the pulley teeth, which are made of rigid material. This stress is distributed over the body of the belt tooth.

Practically speaking, the belt tooth, which is anchored along its base to inextensible longitudinal strands, behaves in the same way as a beam restrained at one end subjected to a vertical load at the opposite end. In the proximity of the base of the tooth, therefore, the elastomeric material receives the thrust transmitted by the pulley tooth and transfers it to the longitudinal strands. Undesirably, the state of stress at the base of the belt tooth is unevenly distributed, and there is an accentuated localization of the forces acting on the rubber in the area of connection between the flank of the loaded belt tooth and the adjacent groove. This localization of forces, and particularly their intensity, may over the course of time result in irreparable impairment of the correct operation of the transmission and the working life of the belt itself.

Attempts have been made to overcome the above drawback by creating circular connection arcs at the base of the belt and on the head of the pulleys with different radii, giving the radius of the pulley head connection a greater value than that of the belt connection with a view to preventing the pulley head connection from compressing the base connection of the belt tooth in a confined area. This solution, however, may prove insufficient, since when very heavy loads are transmitted by the flank of the pulley tooth to the flank of the belt tooth there is a tendency for the connection zone in elastomeric material at the base of the belt to divaricate. In particular, even if the preceding solution is adopted, there is still a risk of extremely localized pressures on the base of the belt tooth and hence an irregular distribution of forces along the base of the belt. It must also be added that resorting to this solution inevitably results in the transfer of loads at a higher point on the belt tooth. Unfortunately, this circumstance has an adverse effect, since it can readily be understood that the belt tooth is increasingly subject to deformation in flexion the further the load is applied away from its base.

It should also be noted that circular arc connections between grooves and teeth in a pulley could be unsuitable for employment with toothed belts such as those disclosed in U.S. Ser. No. 433,789, filed Nov. 9, 1989 (incorporated by reference herein) also filed by the present Applicant. Briefly, it may be stated that the belts described in that application comprise a base connection formed of a curvilinear segment whose length is greater than that corresponding to a circular arc. In essence, according to the solution referred to, the curvilinear connection segments at the base of the tooth could, for example, be formed with a parabolic arc so as to permit the build-up of a greater quantity of elastomeric material compared with a circular arc without altering the dimensions of the tooth.

Even though adoption of the toothed belt referred to in a transmission system composed of pulleys with a conventional profile might continue to be satisfactory, account must be taken of the fact that under particular operating conditions the belt tooth could rise up from its correct position of engagement with the pulley. Since the toothed belt connection, in the form of a parabolic arc, for example, would in fact be closer to the circular arc connection of the pulley tooth, there would be a consequent reduction of the free space in the proximity of the opposed connections when the belt tooth is inside the pulley groove. Subsequently, due to load variations occurring during the transmission of motion, the flat head of the pulley tooth could shift with respect to the positions where it is centered with the central axis of the groove between the belt teeth with the result that the circular arc of the pulley tooth connection by striking the parabolic connection of the belt tooth would exert a mechanical thrust, possibly followed by shifting of the tooth form its correct meshing position.

Furthermore and in general terms, it has been observed that in known pulleys there may be interference between the summit of the belt tooth and that of the pulley tooth in the transient access phase under a particularly heavy load. This interference is generated by elongation of the pitch between the belt teeth resulting in unwanted approximation of the pulley tooth and the belt tooth that has to mesh.

SUMMARY OF THE INVENTION

The purpose of this invention is thus to provide a toothed pulley and a transmission related thereto capable of preventing concentration of forces in the connection area at the base of the belt tooth with which the pulley meshes and any unwanted interference during engagement under heavy loads, and also of permitting their dependable and correct employment with toothed belts whose connection at the base of the tooth involves the provision of a greater quantity of elastomeric material compared with a circular arc connection for a belt tooth of the same dimensions.

An object of the invention is to provide a toothed pulley of predetermined external circumference, the toothed pulley comprising a plurality of grooves alternating with a plurality of teeth. Each groove is symmetrical with respect to a first central radial line and formed of a base and two extended flanks starting from the base and continuing as far as two ends located on a second predetermined circumferential line with a smaller radius than the outer one. Each tooth is symmetrical with respect to a second central radial line and formed of a head delimitated by the outer circumference over a segment contained within two terminal points. Each flank has one end connected by means of a connection to the terminal point of the head of the adjacent tooth. The pulley is characterized in that the connection comprises first and second convex curvilinear segments and a recess, the first and second curvilinear segments, respectively, being tangent to the lower end of the flank and to the terminal point of the head respectively.

Another object of the invention is to provide a transmission means for transmission of motion between a toothed belt made of elastomeric or similar material and at least two pulleys. The transmission means is characterized in that it comprises at least one pulley of the type described above.

BRIEF DESCRIPTION OF THE DRAWINGS

The present invention will be more readily understood from the following detailed description of some of its specific embodiments given by way of non-limiting examples with reference to the accompanying drawings, of which.

DETAILED DESCRIPTION OF THE PREFERRED EMBODIMENTS

Figure 1:
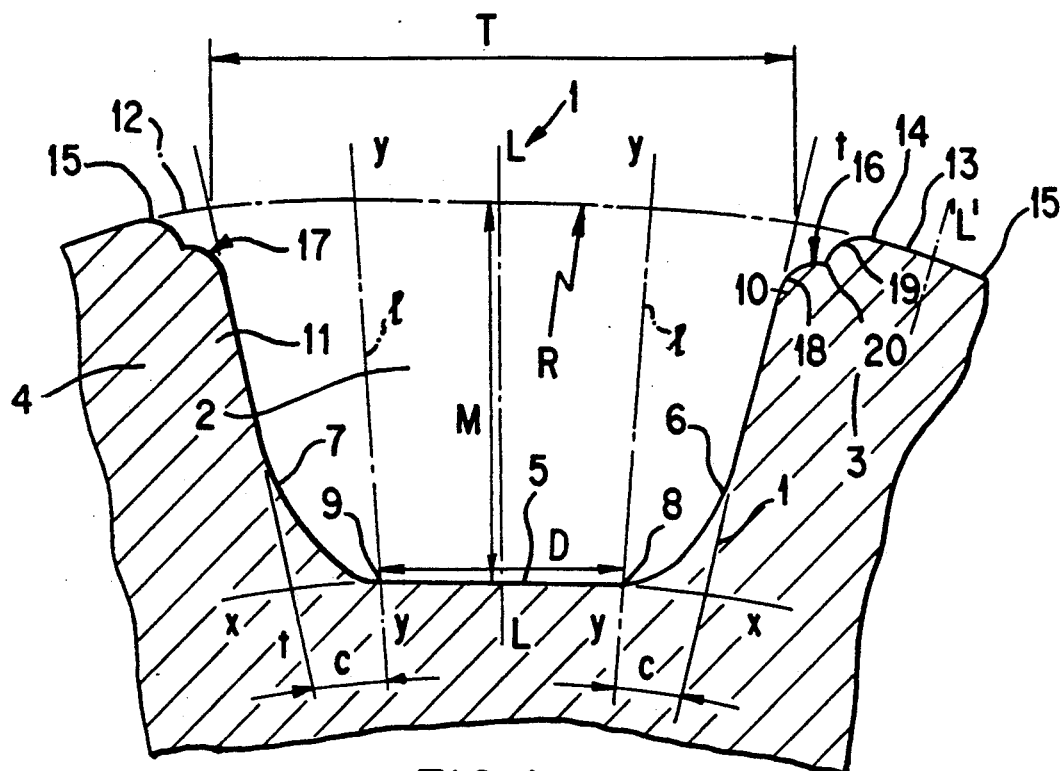
FIG. 1 is a longitudinal sectional view of a toothed pulley showing a groove and the teeth adjacent to the same.

FIG. 1 shows a pulley comprising a groove between adjacent teeth 3 and 4. Groove 2 is symmetrical with respect to the central and radial axis L—L and is formed of a base of length D and of two curvilinear flanks 6, 7 each of which extends from initial ends 8 and 9 located on the base of the groove to final ends 10 and 11. The curvilinear profile of the flank at final ends 10, 11 is defined by tangent t forming pressure angle c with radial lines 1 passing through the initial ends 8,9 on the base. Groove 2 is also defined by a height H measured along axis L—L between groove base 5 and outer circumference 12 of predetermined radius R. The profile delimitating the flanks is tangent to the flank at initial ends 8,9 and is for example a profile in the form of a parabolic arc drawn with respect to axes x and y passing through one of the ends at the base of the groove. Ends 10, 11 of flanks 6, 7 are located on a second circumferential line with a smaller radius than the outer one. Generally, if account is taken of the difference between the outer and the inner radius, it is found that the ratio between this difference and height H lies between 0.08 and 0.43. Each of teeth 3, 4 adjacent to groove 2 is symmetrical with respect to a second central radial line L'—L' and is formed of a head 13 delimitated by outer circumference 12 over a segment contained within two terminal points 14, 15.

The fundamental features of the pulley are connections 16, 17 between final ends 10, 11 of flanks 6, 7 and terminal points 14, 15 of heads 13 of adjacent teeth 3 and 4. In its more general form, each connection is formed of two curvilinear convex segments 18, 19 and recess 20 between segments 18, 19. In addition, the two convex curvilinear segments are tangent to the final end of the flank and to the terminal point of the head of the adjacent tooth respectively. The two curvilinear segments may have a variety of circular or substantially circular profiles, for example, they may be parabolic, elliptical or a similar shape.

FIG. 1 illustrates one possible embodiment of connections 16 and 17 based on two circular curvilinear segments that intersect at a point to form recess 20. As can be seen in the enlarged view in FIG. 2, connection 16 comprises a first circular arc 18 and a second circular arc 19. First arc 18 is defined by a curvature center 21 located on perpendicular line N to tangent t at the lower end point of the flank and second arc 19 by a curvature center 22 located on diametral line F passing through terminal point 14 of the head of tooth 3. In a preferred embodiment corresponding to FIG. 2, the first and second circular arcs have the same radius of curvature. Furthermore, the first and second circular arcs also have particular radius values in relation to the connection of known type, which is defined, as can be clearly seen in FIG. 2, by a single circular arc 23 having its curvature center 24 located on the intersection of straight lines N and F. In more precise terms, the radius of circular arcs 18, 19 is less than the radius of the single circular arc and the ratio between one of the radii of the two circular arcs 18 or 19 and the radius of the single circular arc 23 lies between 0.3 and 0.8, for example, it is 0.5.

Figure 3:
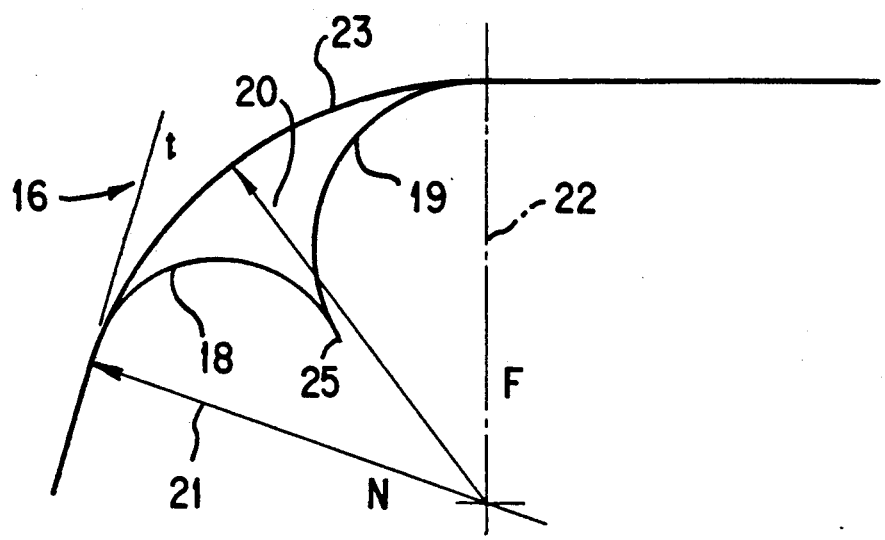
FIGS. 3-5 show some variations of the connection illustrated in FIG. 2.

FIG. 3 illustrates a further embodiment of connection 16 characterized in that the two circular arcs 18, 19 are tangent to each other at point 25 of maximum depth of recess 20.

Figure 4:
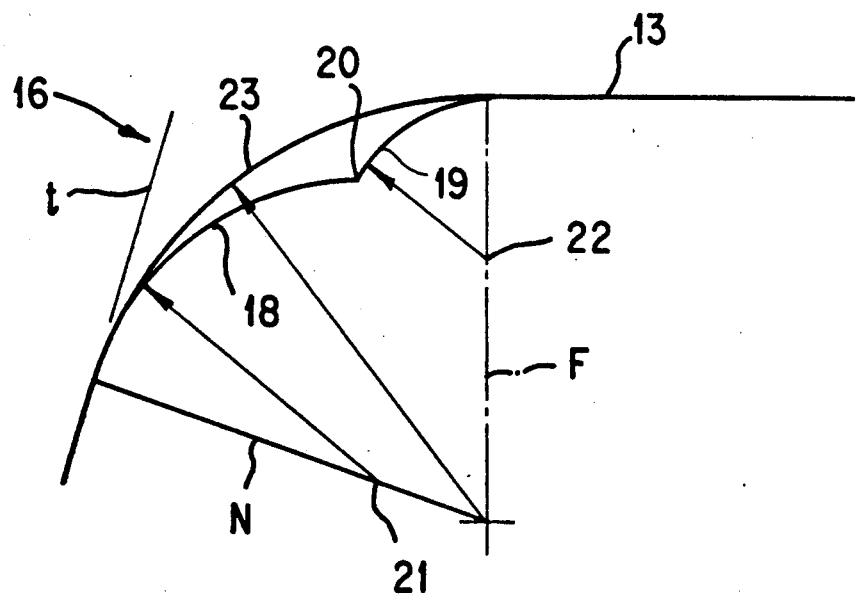

The connection illustrated in FIG. 4 differs from those already described by virtue of the fact that it comprises two circular arcs 18, 19 that differ from each other, with circular arc 18 having the greater radius.

Figure 5:
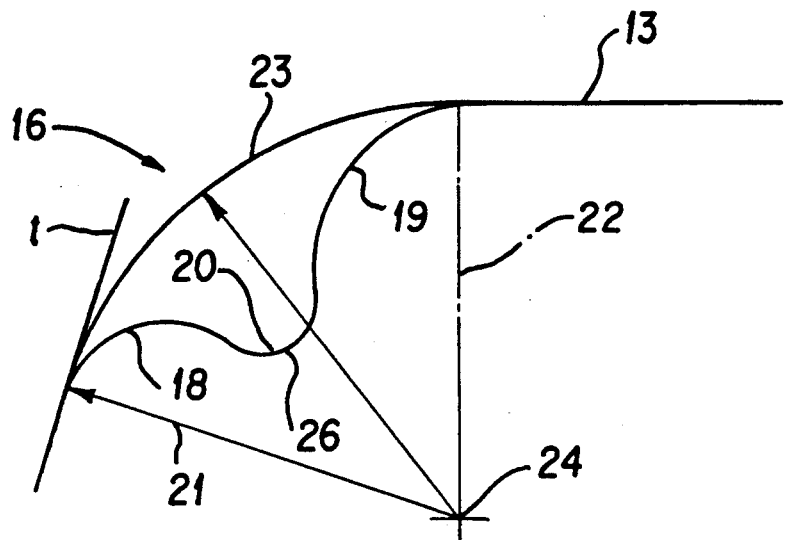

The connection illustrated in FIG. 5 is even more different from those already described insofar as it comprises two circular arcs 18, 19 that are no longer intersecting nor tangent to each other, but united by a third circular arc 26 whose curvature is opposite to that of the lateral arcs so as to form a recess 20.

The pulley of FIG. 1, having head connections as hereinafter described, can be employed with constant pitch toothed belts, for example, with belts forming parts of the transmissions described in U.S. Pat. No. 4,696,665 (incorporated by reference herein), granted to the present Applicant, to provide the dimensional data for the belts and pulleys open for use in combination with the characteristics of the present invention.

Figure 6:
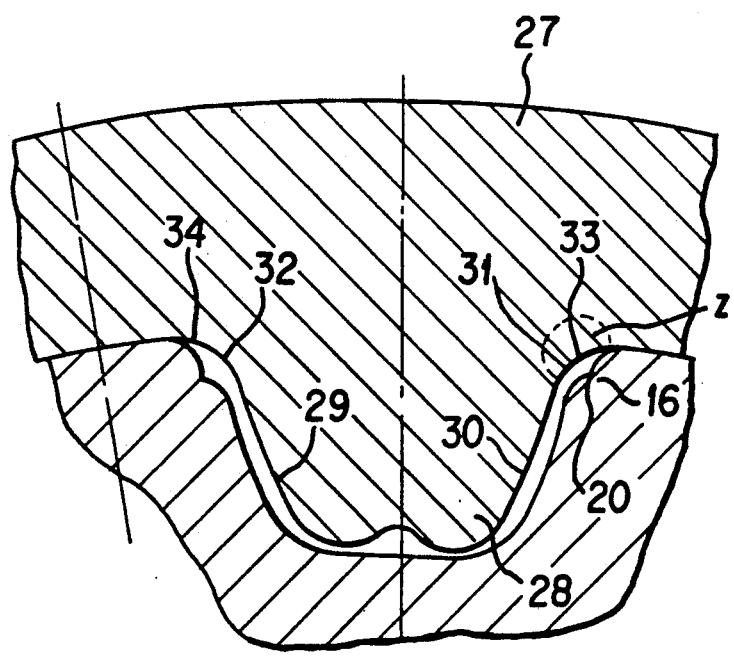
FIG. 6 shows the pulley illustrated in FIG. 1 and a toothed belt in a partial longitudinal sectional view.

A possible embodiment of a transmission with a toothed pulley according to the invention is illustrated by way of example in FIG. 6. In this schematic representation, pulley 1 with a substantially step-like connection 16 meshes with a toothed belt 27 comprising a tooth 28 with parabolic flanks 29, 30 joined to adjacent grooves 31 and 32 by means of circular arc connections 33 and 34.

Figure 2:
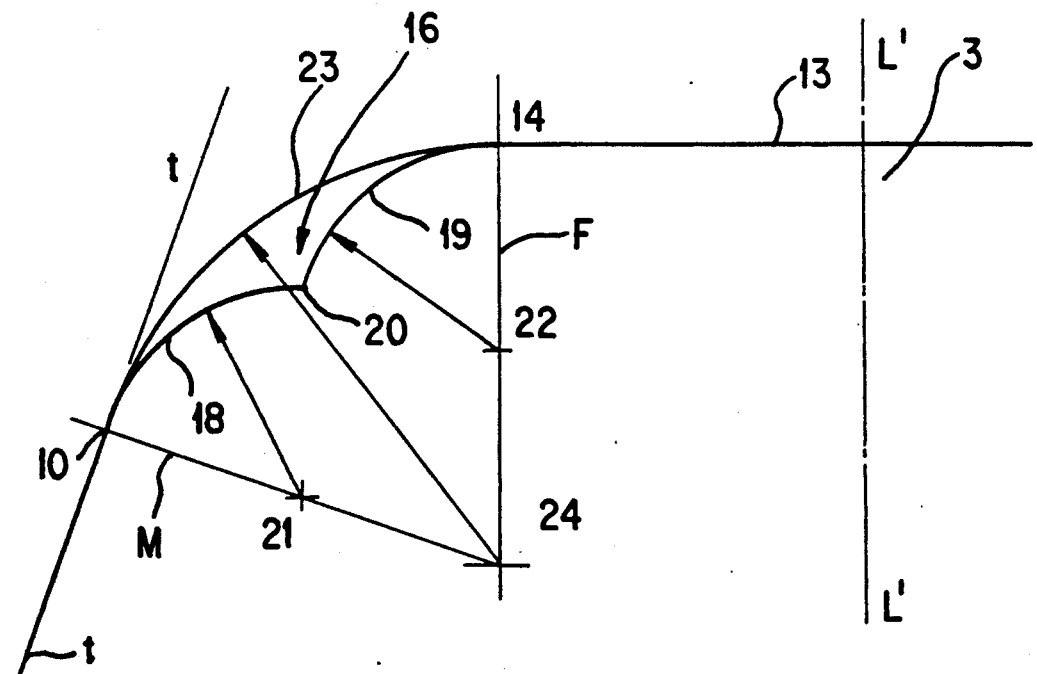
FIG. 2 is an enlarged view of the head connection of the pulley shown in FIG. 1.

With reference to FIGS. 1 and 2 and solely by way of example, the values for a pulley according to the invention are set forth below:

| | |
|---|---|
| Pitch p | = 9.525 |
| Number of teeth | = 20 |
| Radius of outer circumference R | = 29.57 mm |
| Radius of inner circumference passing through final ends 10, 11 of the flanks | = 0.97 R |
| Height H of the groove | = 3.45 mm |
| Distance D between initial ends 8, 9 of the groove base | = 2.26 mm |
| Distance T between tangents t | = 5.8 mm |
| Pressure angle c | = 16 degrees |
| Curve of parabolic arc flanks 8, 9 | $y = 1.1 x^2$ |
| Curvature center C of the single circular arc 23 located on a circumference whose radius relative to that of the outer circumference 12 is 0.34 R | |
| Distance of curvature center 24 from axis L'—L' | = 1.05 mm |
| Ratio between radius of circular arc 18 and radius of arc 23 | = 0.5 |

Figure 7A:
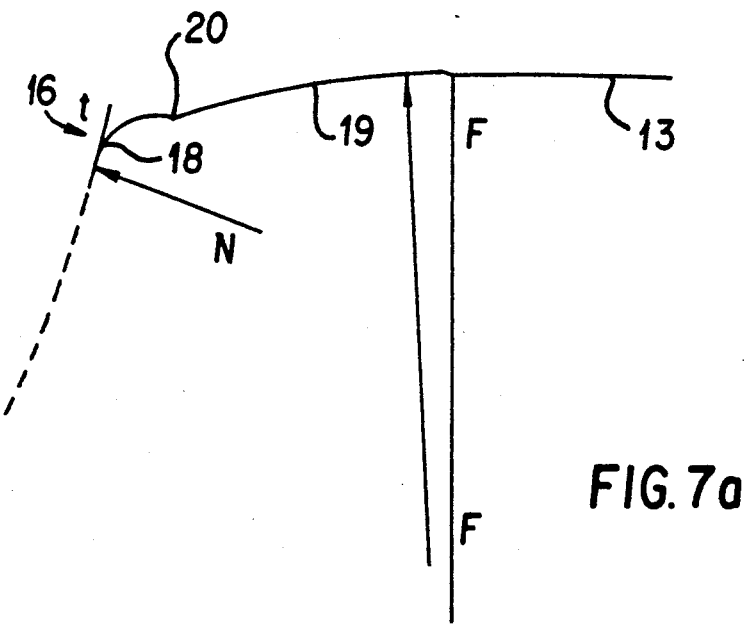
FIGS. 7a and 7b are further variations of the head connection of a toothed pulley according to the invention.
Figure 7B:
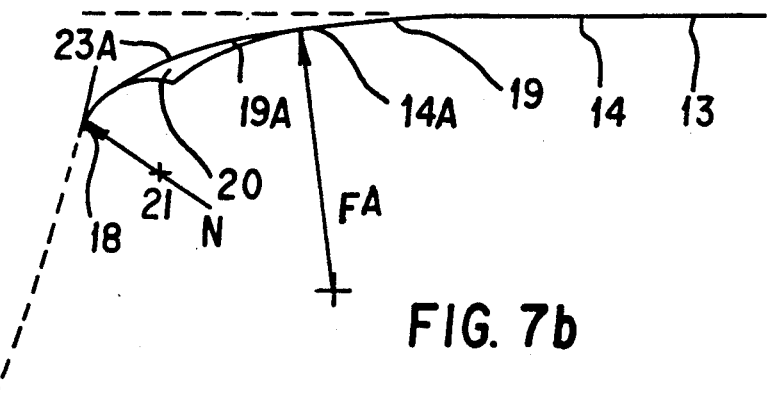

FIGS. 7a and 7b provide an enlarged view of a further embodiment of connections 16, 17 illustrated in FIG. 1. As can be clearly seen, in this embodiment the curvature radius of the first and that of the second circular arc are still located on straight lines N and F respectively. However, the radius of the first circular arc 18 is appreciably smaller than the radius of the second circular arc 19. In particular, the ratio between the radius of arc 18 and that of arc 19 is less than 0.1, for example, it is equal to 0.08. The pulley illustrated in FIGS. 7a and 7b preferably employed with toothed belts such as those disclosed in U.S. Ser. No. 433,789 filed Nov. 9, 1989 (incorporated by reference herein) also filed by the present Applicant. Briefly, the belt comprises teeth alternating with grooves and each tooth comprises two flanks and two roots connecting the flanks to the adjacent grooves. Each root is formed of a curvilinear segment whose first and second ends are located on the end of the flank and on the base line delimiting the grooves respectively. The tooth is defined by a tangent on the flank at the point of intersection between root and flank forming an angle of predetermined value with the groove base line. The fundamental feature of such belt lies in the fact that the first end of the curvilinear root segment coincides with the first terminal point of a circular arc tangent to the flank and to the base line with a curvature center on the bisectrix of said angle of predetermined value. The second end of the curvilinear segment is located between the second terminal point of the circular arc referred to and to the point of intersection between the central line of the groove and the base of the groove.

FIG. 7b illustrates a further embodiment comprising a connection 16, for example, for pulleys with a 14 mm pitch, once again formed of a first curvilinear segment 18 tangent to the flank at the terminal point and a second curvilinear segment 19 tangent to the head of the tooth at the terminal point. In this arrangement, however, there is also a third convex curvilinear segment 19A between the first and the second curvilinear segments, and recess 20 is formed by the intersection between the first and the third curvilinear segment 18 and 19A. Preferably, the first and the third segment 18 and 19A are circular arcs, whereas the second segment 19 is a parabolic arc. More specifically, the first circular arc 18 has its curvature center 21 on perpendicular N to tangent t at the lower end point of the flank, the second curvilinear segment 19 is a part 14A, 14 of a single parabolic arc 23 that originates at the lower end point of the flank, where it is tangent, and terminates tangent to the terminal point of the tooth head, and the third circular segment 19 has its curvature center on a perpendicular FA to the tangent at a point on the single curve 23A. In particular, when the curvature center of third circular arc segment 19A is on the perpendicular at the end of the single parabolic curve 23A coincident with the terminal point of the tooth, the solution in FIG. 7b becomes the same as that in FIG. 7a. The curve of the single parabolic arc 23A in FIG. 7b is none other than the form of the connection of the pulley head 7 described in the above-mentioned Italian patent application filed by the present Applicant. The pulley in FIG. 7b, therefore, due to the presence of recess 20, is suitable for engagement with a toothed belt having a connection at the tooth base like that described in the above-noted Italian patent application with advantages and overcoming of prior art drawbacks as explained below. When the tooth of the belt with a parabolic base connection is inside the pulley groove, as shown in FIG. 7b, the final end of the flank of the groove relative to the final end of the belt tooth is preferably at a greater distance with respect to the plane of the longitudinal strands of the belt.

Figure 8:
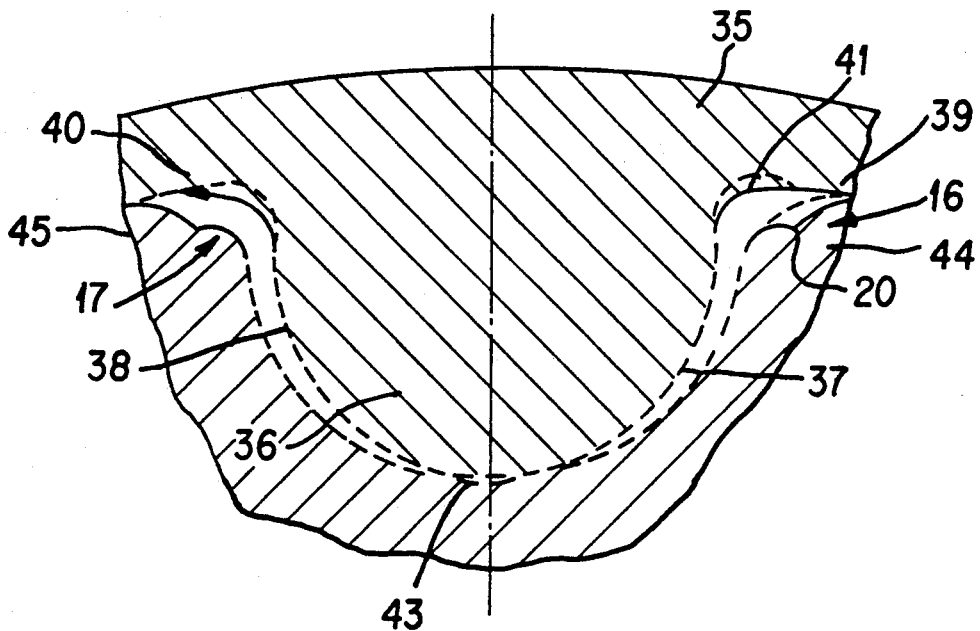
FIG. 8 shows a transmission between a toothed belt and a pulley with a head connection as illustrated in FIG. 7.

FIG. 8 shows a pulley according to the invention with a toothed belt comprising a curvilinear connection as described in the above-mentioned Italian application filed by the present Applicant, that is to say a curvilinear connection extending over a greater distance than a connection in the form of a circular arc. In greater detail, toothed belt 35 of FIG. 8 comprises teeth 36 with curvilinear flanks 37, 38 joined to adjacent grooves 39 and 40 by means of connections 41, 42. Connections 41, 42 can be more particularly formed of parabolic arc profiles tangent to both the tooth flank and the base line delimiting the grooves between the belt teeth. Alternatively, connections 41, 42 may be arcs in the form of an ellipse, a hyperbola or other similar curves. Moreover, the teeth of the belt can be coated as usual with one or more layers of fabric, for example, formed of nylon. Pulley 1 of FIG. 8 comprises a groove 43 with adjacent teeth 44 and 45 and connections 16 and 17 between the flanks and the teeth. Dashed lines are also included in FIG. 8 to indicate connections with a conventional circular arc profile both at the base of the belt tooth and on the head of the pulley tooth.

It is noted that the invention attains all of the objects discussed above. To provide a detailed explanation of the results achieved, consideration will now be given to FIG. 6, in which belt tooth 28 is shown in the position corresponding to the absence of a load to be transferred between belt and pulley. In the loading condition, flank 30 of belt tooth 28 shifts from the condition illustrated in FIG. 6 and is brought into contact with the flank of the pulley groove. In this condition, the ends of circular connection 33 of the belt find themselves in contact with the ends of connection 16 between groove flank and pulley tooth. Nonetheless, the corner areas of the two connections are free from contact due to the presence of recess 20. The elastomeric part around the corner area of connection 33 (marked with a dashed line in FIG.6 and denominated by reference character Z) is free from the localized stresses observed in known toothed transmissions. Consequently, the present invention permits the attainment of substantially uniform tangential stress along the base of the belt tooth. In particular, the solution offered by the invention makes is unnecessary to resort to a circular pulley tooth connection with a radius greater than that of the circular connection at the base of the belt tooth. As a result, a belt tooth meshing with the present pulley is subjected to less deformation in flexion compared with the solution referred to in the prior art.

It is noted that the transmission illustrated in FIG. 8 has an absence of stresses localized at the base of the belt tooth along the corner connection area, similarly to that of FIG. 6.

To provide a better explanation of the results obtained, consideration will first be directed to a transmission comprising a belt 35 with a base connection 41 identified by an arc of greater extent than a circular arc, namely an arc constructed so as to include a greater build-up of elastomeric material compared with a circular arc, as is moreover evidenced by the free space between profile 41 and the underlying pecked profile in the form of a circular arc. It is again assumed that belt 35 with connection 41 is meshed with a pulley groove in which the head connection is formed by the single circular arc drawn in FIG. 8, in other words a connection known in state of-the-art pulleys. During the change from the condition shown in FIG. 8 to loading conditions, there is an approximation of the profiles of the belt flank and the pulley flank. In the course of said relative movement, the circular arc profile of the belt connection, on finding a curvilinear profile at a greater inclination with respect to a profile of a circular arc, would tend to transmit upward-directed mechanical thrusts onto connection 41 with the risk of tending to shift the belt out of its correct attitude for proper engagement.

Connection 16 according to the present invention overcomes the drawback thus referred to. In effect, the formation of a connection 16 formed of two circular arcs instead of a single circular arc, or alternatively as illustrated in FIG. 7b, and in particular, the presence of recess 20, removes material with respect to the conventional circular connection, and thus does away with the presence of unwanted mechanical thrusts tending to shift connection 41 and with it belt tooth 35 from the correct meshing position. Furthermore, in the final position, connections 41 and 16 only come into contact in the proximity of their respective ends, thus leaving their respective corner areas free from unwanted localized stresses. It should also be noted that the present invention overcomes the drawback of unwanted mechanical interference between the summit of the belt tooth and that of the pulley tooth during meshing under a heavy load.

On the assumption that the pitch is lengthened, in fact, even the presence of a relative shift between the belt tooth and the pulley tooth, it turns out that the particular solution offered by the invention, due to recess 20, facilitates meshing, and hence reduces belt tooth wear and deformation.

It should be noted that the above description and the accompanying drawings are merely illustrative of the application of the principles of the present invention and are not limiting. Numerous other arrangements which embody the principles of the invention and which fall within its spirit and scope may be readily devised by those skilled in the art.

We claim:

1. A toothed pulley having a predetermined external circumference defined by a first predetermined circumferential line, said pulley comprising: a plurality of grooves alternating with a plurality of teeth, each groove being disposed symmetrically with respect to a first central radial line L—L and defined by a base and two extended flanks extending from two initial ends and continuing as far as two final ends located on a second predetermined circumferential line, said second circumferential line having a smaller radius than said first circumferential line, each tooth being disposed symmetrically with respect to a second central radial line L'—L' and formed of a head delimitated by said first circumferential line over a segment contained between two terminal points, each flank having a final end connected by means of a connection to the terminal point of the head of the adjacent tooth, said connection comprising at least a first and a second convex curvilinear segment and a recess, said first and second curvilinear segments respectively being tangent to the final end of the flank and to the terminal point of the head respectively.

2. A pulley as in claim 1 wherein said first and second convex curvilinear segments meet at a point to form said recess.

3. A pulley as in claim 1 or 2 wherein said first and second curvilinear segments have the same profile.

4. A pulley as in claim 1 or 2 wherein said first and second curvilinear segments are of equal length.

5. A pulley as in claim 1 wherein said first and second curvilinear segments each comprise a substantially circular arc.

6. A toothed pulley as in claim 1 wherein said first and second curvilinear segments and said recess are originated by first and second circular arcs, said first circular arc being tangent to the flank and having its center of curvature located on a line N which is perpendicular to a tangent at said end point and said second circular arc being tangent to the head at the terminal point and having its center of curvature on a diameter of the outer circumference of the pulley passing through the terminal point of the head of the tooth.

7. A pulley as in claim 6 wherein the radius of said first and second circular arcs is smaller than the radius of a single circular arc having its center at the point of intersection between said perpendicular to the tangent to the flank and said pulley diameter passing through the terminal point of the head, said single circular arc being drawn between the flank and the head of the tooth.

8. A pulley as in claim 7 wherein the ratio between the radii of the first and second circular arcs and the radius of the single circular arc lies between 0.3 and 0.8.

9. A pulley as in claim 7 wherein said first and second circular arcs intersect at a point and form said recess.

10. A pulley as in claim 7 wherein said first and second circular arcs are tangent to each other at a point and form said recess.

11. A pulley as in claim 1 wherein said two convex curvilinear segments are two circular arcs devoid of reciprocal points of contact and said recess is formed by a third concave curvilinear profile tangent to said lateral curvilinear segments.

12. A pulley as in claim 6 wherein the ratio between the radius of the first circular arc and the radius of the second circular arc is less than 0.1.

13. A pulley as in claim 6 wherein the ratio between the radius of the first and second circular arcs is 0.08.

14. A pulley as in claim 1 wherein a further convex curvilinear segment is provided between said first and second curvilinear segments tangent to the final end of the flank and the terminal point of the head, said first curvilinear segment and said further curvilinear segment being successive circular arcs and said second curvilinear segment being a parabolic arc and constituting the final part of a single parabolic curve having its vertex at the final end of the flank, said first circular arc having a radius of curvature on the perpendicular to the tangent to the flank at its final end point, said further curvilinear segment having its center of curvature on a line perpendicular to the tangent at a point of said single parabolic curve.

15. A transmission for transmitting motion, comprising a toothed belt and at least two pulleys, wherein at least one of said pulleys comprises: a toothed pulley having a predetermined external circumference defined by a first predetermined circumferential line, said toothed pulley comprising: a plurality of grooves alternating with a plurality of teeth, each groove being disposed symmetrically with respect to a first central radial line L—L and defined by a base and two extended flanks extending from two initial ends and continuing as far as two final ends located on a second predetermined circumferential line, said second circumferential line having a smaller radius than said first circumferential line, each tooth being disposed symmetrically with respect to a second central radial line L'—L' and formed of a head delimitated by said first circumferential line over a segment contained between two terminal points, each flank having a final end connected by means of a connection to the terminal point of the head of the adjacent tooth, said connection comprising at least a first and a second convex curvilinear segment and a recess, said first and second curvilinear segments respectively being tangent to the final end of the flank and to the terminal point of the head respectively.

16. A transmission for transmitting motion, comprising a toothed belt and at least two pulleys,
said toothed belt comprising a plurality of teeth and a plurality of grooves alternating with said teeth, each tooth being formed of a head, two roots, and two extended flanks starting from the head, each root comprising a curvilinear continuous arc segment having first and second ends located on an end of one of said flanks and on a base line of an adjacent one of said grooves respectively, each tooth having a tangent at a point of intersection between its root and flank forming an angle of predetermined value with the base line of said one of said grooves,
at least one of said pulleys comprising a toothed pulley having a predetermined external circumference defined by a first predetermined circumferential line,
said toothed pulley comprising: a plurality of grooves alternating with a plurality of teeth, each groove being disposed symmetrically with respect to a first central radial line L—L and defined by a base and two extended flanks extending from two initial ends and continuing as far as two final ends located on a second predetermined circumferential line, said second circumferential line having a smaller radius than said first circumferential line, each tooth being disposed symmetrically with respect to a second central radial line L'—L' and formed of a head delimitated by said first circumferential line over a segment contained between two terminal points, each flank having its final end connected by means of a connection to a terminal point of the head of the adjacent tooth, said connection comprising at least a first and second curvilinear segment and a recess, said first and second curvilinear segments respectively being tangent to the final end of the flank and to the terminal point of the head of the adjacent tooth respectively,
said toothed pulley engaging with said toothed belt in which a first end of one of said roots coincides with a first terminal point of a circular arc tangent to the flank and to said base line with a center of curvature on a bisectrix of said predetermined angle and a second end of said one of said roots is located between a second terminal point of said circular arc and a point of intersection between a central line of the groove and the base of the groove and at the most is located on said point of intersection on the base of the groove.

17. A transmission for transmitting motion, comprising a toothed belt and at least two pulleys, said toothed belt comprising a plurality of teeth alternating with a plurality of grooves delimited by a base line when the belt is stretched, each tooth being joined to the adjacent grooves by a curvilinear connection segment, said curvilinear connection segment between the tooth and the adjacent groove comprising a parabolic arc tangent to a flank of said tooth and the base line, each of said two pulleys comprising a toothed pulley having a predetermined external circumference defined by a first predetermined circumferential line, said toothed pulley comprising: a plurality of grooves alternating with a plurality of teeth, each groove being disposed symmetrically with respect to a first central radial line L—L and defined by a base and two extended flanks extending from two initial ends and continuing as far as two final ends located on a second predetermined circumferential line, said second circumferential line having a smaller radius than said first circumferential line, each tooth being disposed symmetrically with respect to a second central radial line L'—L' and formed of a head delimited by said first circumferential lien over a segment contained between two terminal points, each flank having a final end connected by means of a connection to the terminal point of the head of the adjacent tooth, said connection comprising at least a first and a second convex curvilinear segment and a recess, said first and second curvilinear segments respectively being tangent to the final end of the flank and to the terminal point of the head respectively, wherein said first and second curvilinear segments and said recess are originated by first and second circular arcs, said first circular arc being tangent to the flank and having its center of curvature located on a line N which is perpendicular to a tangent at said end point and said second circular arc being tangent to the head at the terminal point and having its center of curvature on a diameter of the outer circumference of the pulley passing through the terminal point of the head of the tooth and wherein the ratio between the radius of the first circular arc and the radius of the second circular arc is less than 0.1.

18. A transmission for transmitting motion, comprising a toothed belt and at least two pulleys, said belt comprising teeth that alternate with grooves and are joined to each other by a parabolic arc segment, said pulleys comprising a toothed pulley having a predetermined external circumference defined by a first predetermined circumferential line, said toothed pulley comprising: a plurality of grooves alternating with a plurality of teeth, each groove being disposed symmetrically with respect to a first central radial line L—L and defined by a base and two extended flanks extending from two initial ends and continuing as far as two final ends located on a second predetermined circumferential line, said second circumferential line having a smaller radius than said first circumferential line, each tooth being disposed symmetrically with respect to a second central radial line L'—L' and formed of a head delimitated by said first circumferential line over a segment contained between two terminal points, each flank having a final end connected by means of a connection to the terminal point of the head of the adjacent tooth, said connection comprising at least a first and a second convex curvilinear segment and a recess, said first and second curvilinear segments respectively being tangent to the final end of the flank and to the terminal point of the head respectively and wherein a further convex curvilinear segment is provided between said first and second curvilinear segments tangent to the final end of the flank and the terminal point of the head, said first curvilinear segment and said further curvilinear segment being successive circular arcs and said second curvilinear segment being a parabolic arc and constituting the final part of a single parabolic curve having its vertex at the final end of the flank, said first circular arc having a radius of curvature on the perpendicular to the tangent to the flank at its final end point, said further curvilinear segment having its center of curvature on a line perpendicular to the tangent at a point of said single parabolic curve.

* * * * *